US011750901B2

(12) United States Patent
Kojima (10) Patent No.: US 11,750,901 B2
(45) Date of Patent: Sep. 5, 2023

(54) IMAGE CAPTURING APPARATUS

(71) Applicant: CANON KABUSHIKI KAISHA, Tokyo (JP)

(72) Inventor: Yutaka Kojima, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/839,670

(22) Filed: Jun. 14, 2022

(65) Prior Publication Data

US 2022/0417393 A1    Dec. 29, 2022

(30) Foreign Application Priority Data

Jun. 25, 2021 (JP) ................................ 2021-105512

(51) Int. Cl.
*H04N 23/51* (2023.01)
*H04N 23/53* (2023.01)
*H04N 23/55* (2023.01)

(52) U.S. Cl.
CPC ............ *H04N 23/51* (2023.01); *H04N 23/53* (2023.01); *H04N 23/55* (2023.01)

(58) Field of Classification Search
CPC ........ H04N 23/51; H04N 23/53; H04N 23/55; H04N 23/631
See application file for complete search history.

(56) References Cited

U.S. PATENT DOCUMENTS

| 2015/0229898 A1* | 8/2015 | Rivard ..................... H04N 9/76 348/223.1 |
| 2020/0322541 A1* | 10/2020 | Midorikawa ........ H04N 23/635 |
| 2020/0341627 A1* | 10/2020 | Ehira ..................... G06F 3/0488 |
| 2021/0250491 A1* | 8/2021 | Shigematsu ........... G03B 17/20 |
| 2022/0053142 A1* | 2/2022 | Manzari ................ H04N 23/69 |

FOREIGN PATENT DOCUMENTS

JP           4931769 B2    5/2012

* cited by examiner

*Primary Examiner* — Amy R Hsu
(74) *Attorney, Agent, or Firm* — Cowan, Liebowitz & Latman, P.C.

(57) ABSTRACT

An image capturing apparatus having a touch panel mounted on a display unit on the rear side of its housing is provided with a posture detection unit; a first gripping unit positioned on side of the housing when the posture is a normal position; a second gripping unit positioned on side of the housing when the posture is a vertical position; a first operating member operable by a finger of a hand that is gripping the first gripping unit; a second operating member operable by a finger of a hand that is gripping the second gripping unit; and a control unit that displays a first button for deactivating operations from the second operating member on the display screen, and receives input to the first button via the touch panel. The display position of the first button on the display unit is set based on a first virtual circle for which the center point has been set in the range of the first gripping unit or the second gripping unit, and the radius of the first virtual circle is a tangential line that reaches from the center point to the outer edge of the display unit, cutting across the display unit.

10 Claims, 9 Drawing Sheets

IMAGE CAPTURING APPARATUS

BACKGROUND OF THE INVENTION

Field of the Invention

The present invention relates to an image capturing apparatus.

Description of the Related Art

Figure 9A:
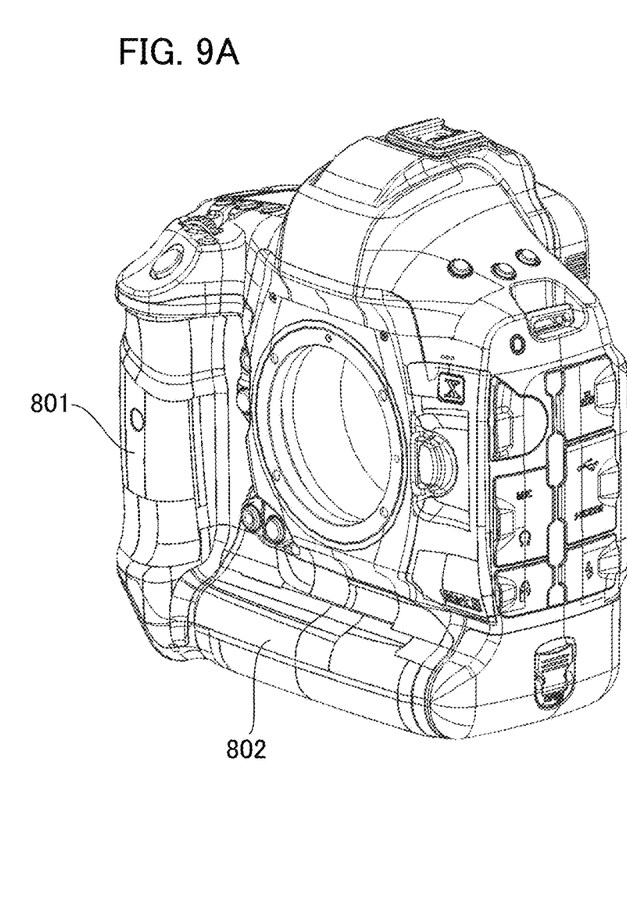
FIGS. 9A, and B are perspective views showing examples of prior image capturing apparatuses.
Figure 9B:
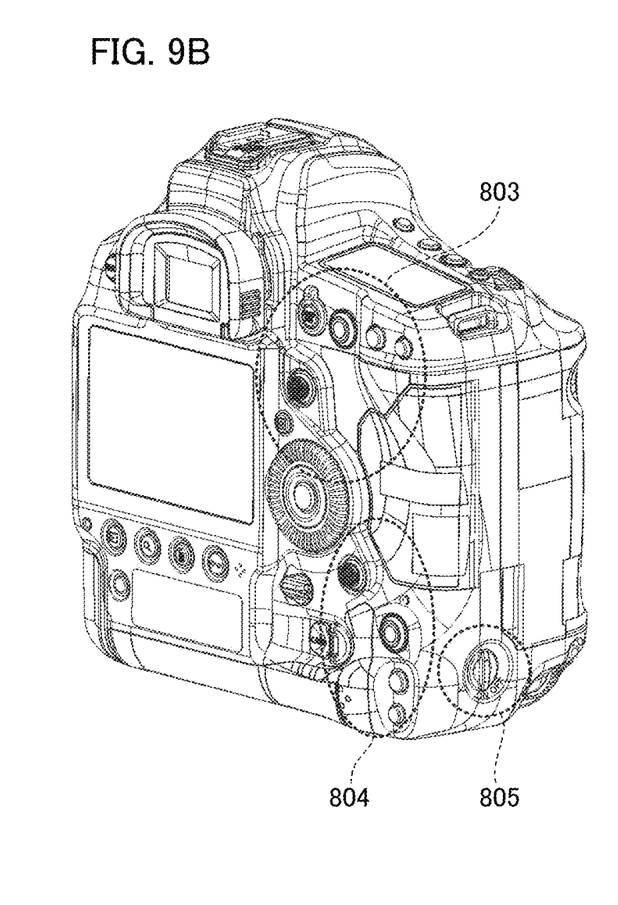

Conventionally, image capturing apparatuses have been produced that have a gripping unit for a normal position, which is gripped when capturing images in a normal position, and a gripping unit for a vertical position, which is gripped when capturing images in a vertical position. In relation to this type of image capturing apparatus, a product is also known that, as is shown in FIG. 9, has an operating member 803 for use in the normal position corresponding to a normal position gripping unit 801, and an operating member 804 for use in a vertical position corresponding to a vertical position gripping unit 802. In the example of the image capturing apparatus that is shown in FIG. 9, it is possible to mechanically switch the operating member 804, which is for use in the vertical position, between activated and deactivated by rotating a rotating switch 805.

In addition, for example, Japanese Patent No. 4931769 discloses a technology that sets the parameters related to image capturing such as each type of image capturing mode, the image capturing conditions, and the like for each of the normal position and the vertical position, and automatically switches between the parameters for the normal position and parameters for the vertical position according to the determination results of a posture detection unit.

In an image capturing apparatus provided with an operating member for normal position and an operating member for vertical position, in the case in which the operating member for vertical position is mechanically switched between activated and deactivated using a switch, operations become difficult in situations such as, for example, when the user is looking into the finder. There is a demand for an image capturing apparatus that can switch the operating member for the vertical position described above between activated and deactivated with a smaller chance of erroneous operations, and that can be easily operated.

In addition, the above-explained Japanese Patent No. 4931769 merely automatically switches the parameters related to image capturing according to the posture of the image capturing apparatus. Therefore, there is room for further improvements to the operational system for the appropriate switching of the operating member for the vertical position between activated and deactivated by the user.

SUMMARY OF THE INVENTION

One embodiment of the present invention is an image capturing apparatus that has, on a rear surface of a housing, a display unit, and a touch panel that has been mounted on the display unit. The image capturing apparatus is provided with a posture detection unit configured to detect a normal position and a vertical position of the image capturing apparatus; a first gripping unit configured to be positioned on side of the housing when the posture of the image capturing apparatus is the normal position; a second gripping unit configured to be positioned on side of the housing when the posture of the image capturing apparatus is the vertical position; a first operating member operable by a finger of a hand that is gripping the first gripping unit; a second operating member operable by a finger of a hand that is gripping the second gripping unit; and a control unit configured to display a first button that is configured to deactivate operations from the second operating member on a display unit, and to receive input to the first button via the touch panel. The display position of the first button on the display unit is set based on a first virtual circle that has been set with its center point in a range of the first gripping unit or the second gripping unit, wherein the radius of the first virtual circle is a tangential line that reaches from the center point to the outer edge of the display unit, cutting across the display unit.

Further features of the present invention will become apparent from the following description of exemplary embodiments with reference to the attached drawings.

DESCRIPTION OF THE EMBODIMENTS

Below, embodiments for implementing the present invention will be explained with reference to the attached drawings and the like. However, the necessary elements of the present invention are not limited to the entirety of the characteristics that are explained in the embodiments below.

Figure 1A:
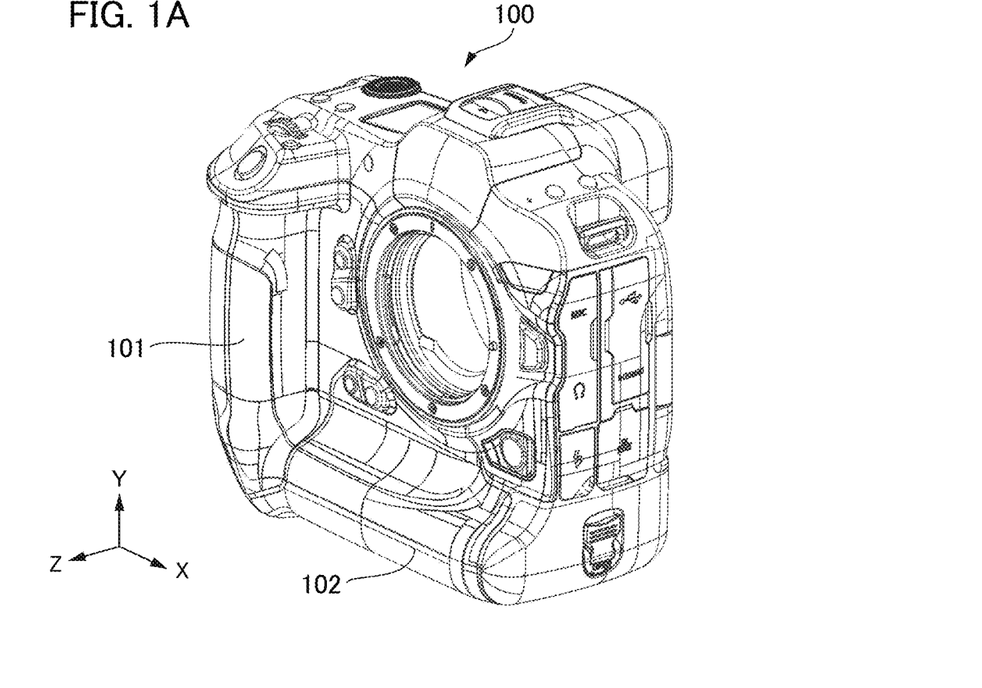
FIGS. 1A, and B are perspective views showing an example of an image capturing apparatus in the present embodiment.
Figure 1B:
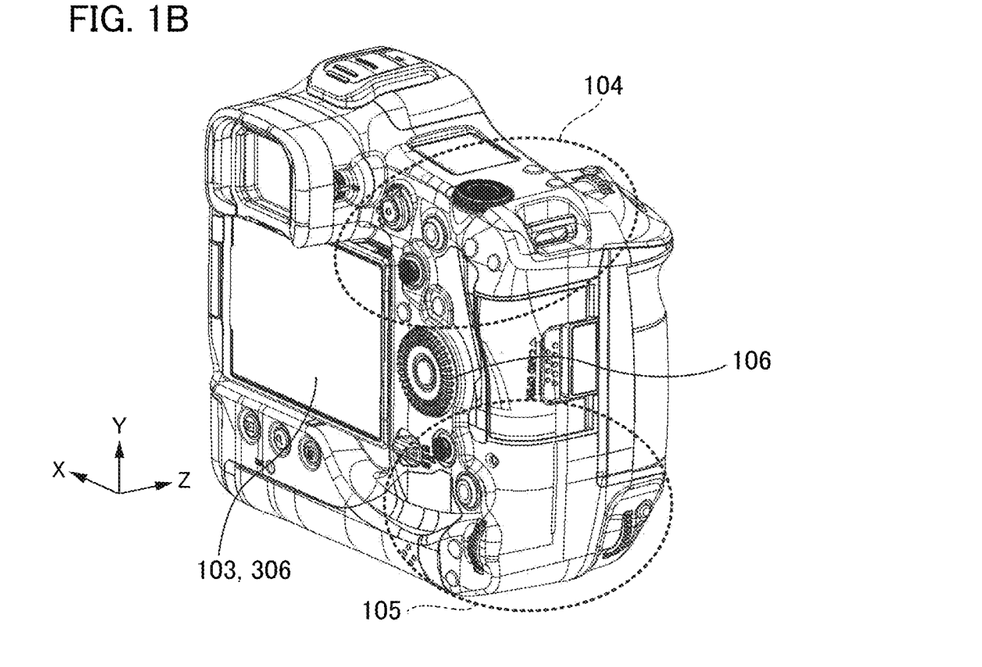

In addition, in the drawings, an XYZ coordinate system is shown as an appropriate three-dimensional Cartesian coordinate system. In the XYZ coordinate system, the Z direction is the direction that is parallel to the optical axis of the optical system (not shown). The X direction is the direction that is orthogonal to the Z direction, and corresponds to the direction of the left-right diagonal in FIG. 1. The Y direction is the direction that is orthogonal to both the X direction and the Z direction, and corresponds to the vertical direction in FIG. 1.

FIGS. 1A, and B, are perspective views showing an example of an image capturing apparatus 100 in the present embodiment. FIG. 1A shows the front side of the image capturing apparatus 100, and FIG. 1B shows the rear side of the image capturing apparatus 100.

The housing of the image capturing apparatus 100 has a normal position gripping unit 101 and a vertical position gripping unit 102 built into it. In FIG. 1A, the normal position gripping unit 101 is disposed on the plain that is orthogonal to the optical axis of the optical system (not shown) (the XY plain), so as to extend in the vertical direction in the diagram (the Y direction). In addition, the vertical position gripping unit 102 is disposed on the above-described XY plain so as to extend in the direction that is orthogonal to the extension direction of the normal position gripping unit 101 (the X direction).

The normal position gripping unit 101 is one example of a first griping unit, and is positioned on side of the housing when the posture of the image capturing apparatus 100 is the normal position. The vertical position gripping unit 102 is one example of a second gripping unit, and is positioned on side of the housing when the posture of the image capturing apparatus 100 is the vertical position posture.

In addition, as is shown in FIG. 1B, a display unit 103, a first operating members group 104, a second operating members group 105, and a physical switch 106 are disposed on the rear side of the housing of the image capturing apparatus 100.

The display unit 103 is configured by a liquid crystal display, and is able to display a live view image during image capturing, a preview image of the image capturing results, a menu screen, and the like. The display unit 103 has an openable/closable, and rotatable vari-angle mechanism, and the inclination, position, and the like of the display screen in relation to the rear of the image capturing apparatus 100 can be changed.

In addition, a touch panel unit 306, which is made translucent, is mounted on the surface of the display unit 103. The touch panel unit 306 is a configuration such as an electrostatic capacitance method or the like, and the image capturing apparatus 100 can receive user operations via the touch panel unit 306.

The first operating members group 104 is disposed on the upper corner portion of the rear side of the housing in FIG. 1B, and includes a plurality of operating members that are in the vicinity of the normal position gripping unit 101. The operating members that belong to the first operating members group 104 can be operated by a finger of a hand that is gripping the normal position gripping unit 101, and primarily receive operations from the user when the image capturing apparatus 100 is being used in the normal position.

The second operating members group 105 is disposed in the lower corner portion of the rear side of the housing in FIG. 1B, and includes a plurality of operating members that are in the vicinity of the normal position gripping unit 101 and the vertical position gripping unit 102. The operating members that belong to the second operating members group 105 can be operated by a finger of a hand that is gripping the vertical position gripping unit 102, and primarily receive user operations when the image capturing apparatus 100 is being used in the vertical position.

In addition, the second operating members group 105 can be put in a deactivated state (disabled) in which it does not receive operations during use in the normal position due to the control of a central processing unit (CPU) 301 to be described below. By deactivating the second operating members group 105 during use in the normal position, it is possible to, for example, prevent the occurrence of malfunctions even when the second operating members group 105 is accidentally touched when images are being captured in the normal position.

The physical switch 106 is an operations member that combines, for example, a dial-type selector, a cross key, and a determining button. As an example, the physical switch 106 receives each type of operation from the user including commands for selecting the ranging point during image capturing, changing the settings of the image capturing apparatus 100, and reproducing, erasing, or editing captured images, and the like.

Figure 2:
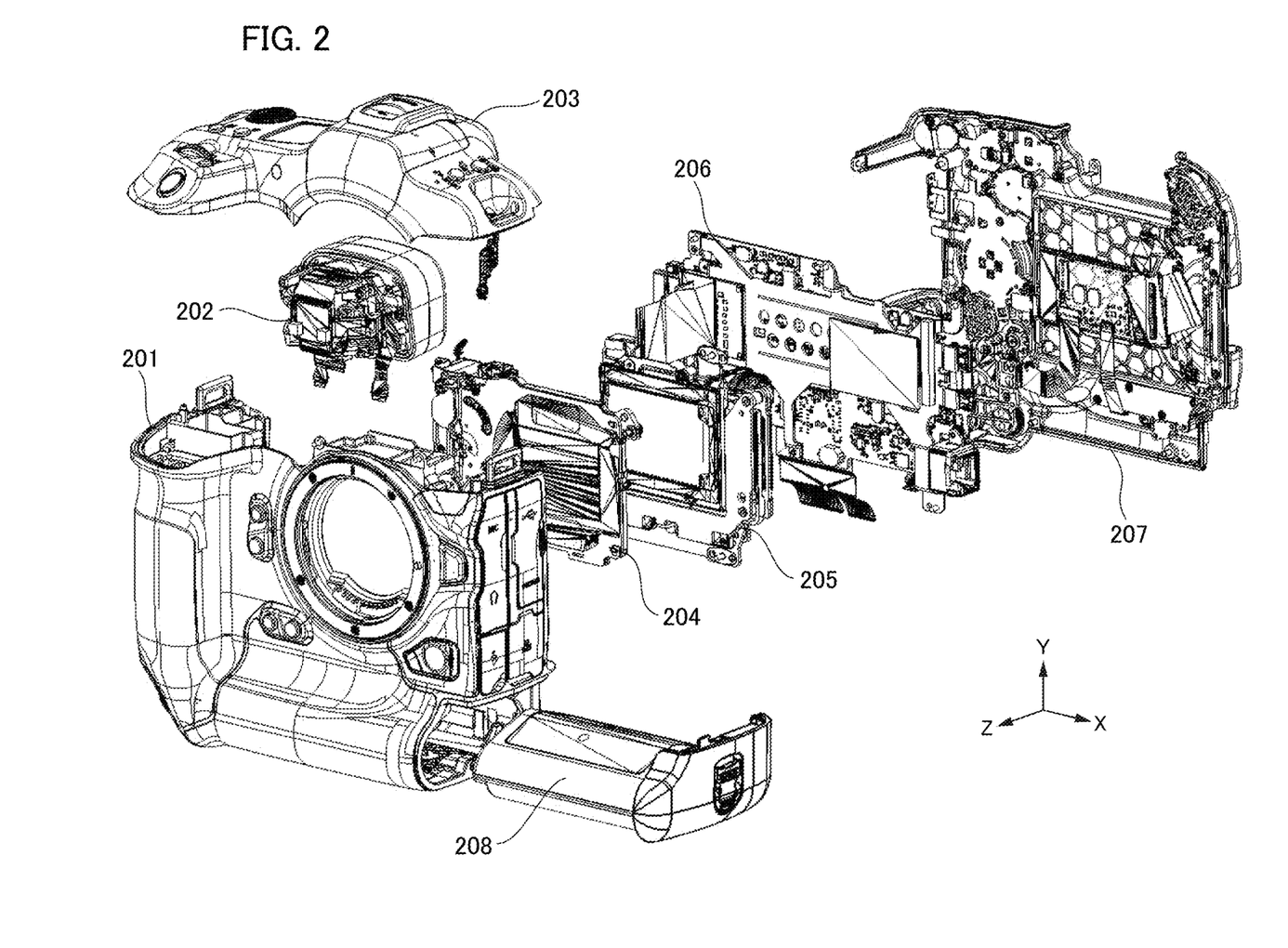
FIG. 2 is an exploded perspective view of an image capturing apparatus in the present embodiment.

FIG. 2 is an exploded perspective view of the image capturing apparatus 100 in the present embodiment.

The image capturing apparatus 100 has a front cover unit 201, an EVF unit 202, a top cover unit 203, a shutter unit 204, an image capturing unit 205, a main substrate 206, a rear cover unit 207, and a battery 208.

The front cover unit 201 is a cover for the front side of the image capturing apparatus 100, and also functions as a portion of the chassis that maintains the rigidity of the image capturing apparatus 100. The front cover unit 201 is formed from, for example, a lightweight and strong magnesium alloy so as to ensure strength during impact when dropped, or the like.

For example, a lens mount for attaching a lens, an electric contact pin for transmitting electricity to the elements on the lens side, a physical operating button that is disposed on the front side of the image capturing apparatus 100, an ear-ring for suspending a strap, or the like are assembled to the front cover unit 201. In addition, the front cover unit 201 is an externally visible part of the image capturing apparatus and therefore has been painted for visual appeal, and in addition, a grip rubber or the like made from rubber for gripping the image capturing apparatus 100 is attached thereto.

Each element from the above EVF unit 202 to the rear cover unit 207 are assembled in order so as to be built up on the rear side of the front cover unit 201. In addition, a battery house for storing the battery 208 is formed on the underside of the image capturing apparatus 100 by combining the front cover unit 201 and an underside cover that is not shown.

The EVF unit 202 is an electric view finder for providing the user with an electric finder image. The EVF unit 202 includes, for example, an eyepiece, a diopter adjusting mechanism, an organic EL (electro luminescence) crystal panel, an ocular detection sensor for detecting an eye (proximity sensor), or the like. In addition, the EVF unit 202 is connected to the main substrate 206 via a flexible printed circuit (FPC).

As the ocular detection sensor of the EVF unit 202, for example, a sensor that projects infrared light and detects a nearby object based on the presence or absence of reflected light that has been reflected off an object can be used. The EVF unit 202 can perform detection for the presence or absence of a user's eye using the above-described ocular detection sensor.

In addition, the EVF unit 202 is able to have the user confirm the image capturing angle of view by displaying a live view of the image that is being captured by the image capturing unit 205 on the organic EL liquid crystal panel in real time. In addition, the organic EL liquid crystal panel of the EVF unit 202 is also able to display each type of image that is displayed on the display unit 103 (the menu screen, image reproducing, and the like). It is thereby possible for the user to confirm settings changes in the menu and image capturing results while still looking into the EVF unit 202.

The top cover unit 203 is a cover for the top side of the image capturing apparatus 100, and also functions as a portion of the chassis that maintains the rigidity of the image capturing apparatus 100. The top cover unit 203 is also formed from, for example, magnesium alloy in the same manner as the front cover unit 201.

For example, a release button, an accessory shoe, the above-described first operating members group 104, and a liquid crustal panel that displays the parameters that have been set using the first operating members group 104, and the like, are assembled to the top cover unit 203. In addition, the top cover unit 203 is an externally visible part of the image capturing apparatus, and therefore is painted for visual appeal.

The shutter unit 204 is configured by, for example, a mechanical shutter that includes a focal plane shutter, a sequence mechanism, or the like, and is a module that adjusts the exposure amount of the image capturing unit 205. Note that an electronic shutter that determines the exposure amount by forming electric slits for each pixel array of the image capturing elements of the image capturing unit 205 may be used instead of a shutter unit 204. Conversely, the shutter unit 204 may be configured to adjust the exposure amount by forming slits using a combination of the above-described electronic shutter and mechanical shutter.

The image capturing unit 205 is a module that captures images of subjects that have been formed by a lens. The image capturing unit 205 includes image capturing elements such as a CCD or a CMOS that perform photoelectric conversion, A/D conversion circuits that convert the analogue signal output from the image capturing element into a digital signal, a drive circuit that drives the image capturing elements, and the like. In addition, the image capturing unit 205 may also further include a stabilizer unit that reduces blur by vibrating the image capturing elements using a driving mechanism that employs a magnetic force in order to suppress blur in the captured image that is caused by the image capturing apparatus 100 shaking, or the like.

The main substrate 206 is a multi-layer substrate that configures a control apparatus that integrally controls the image capturing apparatus 100. The main substrate 206 is provided with ICs such as a CPU 301, a nonvolatile memory 302, and the like, a connector that connects the FPCs and the like that extend from each element, and the like.

The rear cover unit 207 is a cover for the rear side of the image capturing apparatus 100, and also functions as a portion of the chassis that maintains the rigidity of the image capturing apparatus 100. The rear cover unit 207 is also formed from, for example, a magnesium alloy, or the like in the same manner as the front cover unit 201.

The above-described display unit 103, the second operating members group 105, the physical switch 106, and the like are assembled to the rear cover unit 207. In addition, the rear cover unit 207 is an externally visible part of the image capturing apparatus, and therefore is painted for visual appeal.

Figure 3:
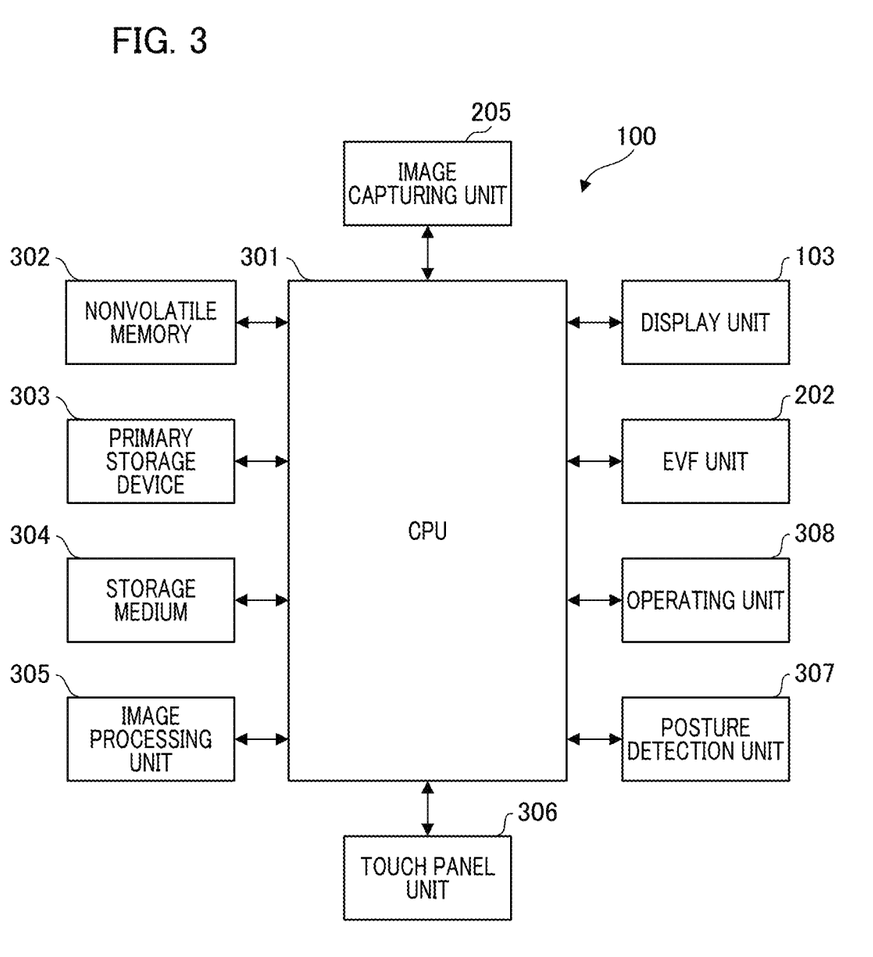
FIG. 3 is a block diagram showing an example of a configuration of an image capturing apparatus in the present embodiment.

FIG. 3 is a block diagram showing an example of a configuration of the image capturing apparatus 100 in the present embodiment.

The image capturing apparatus 100 has a display unit 103, an EVF unit 202, an image capturing unit 205, a CPU 301, a nonvolatile memory 302, a primary storage device 303, a storage medium 304, an image processing unit 305, a touch panel unit 306, a posture detection unit 307, and an operating unit 308. The elements shown in FIG. 3 other than the CPU 301 are each connected to the CPU 301.

From among the elements that are shown in FIG. 3, the CPU 301, the nonvolatile memory 302, the primary storage device 303, and the image processing unit 305 are configured by semiconductor elements such as ICs, microcomputers, or the like, and are provided on the main substrate 206 along with the posture detection unit 307. In addition, from among the elements shown in FIG. 3, the configurations of the display unit 103, the EVF unit 202, the image capturing unit 205, and the touch panel unit 306 have already been explained, and therefore, all redundant explanations thereof will be omitted. Note that the operating unit 308 in FIG. 3 is shown together with the operating members that are provided on the image capturing apparatus 100, and includes the first operating members group 104, the second operating members group 105, and the physical switch 106.

The CPU 301 is one example of a control unit, and is configured by a microprocessor that executes each type of processing for the image capturing apparatus 100, or the like. For example, the CPU 301 receives digital image signals and the like that are output from the image capturing unit 205, and outputs video image signals to the display unit 103, and the organic EL liquid crystal panel in the EVF unit 202. In addition, the CPU 301 generates image data from the output of the image capturing unit 205, along with executing the recording processing of the image data to the storage medium 304, the read-out processing of the saved images from the storage medium 304, and the like.

The nonvolatile memory 302 is configured by, for example, a flash memory or the like, and saves program codes, an operating system (OS), and the like that perform the device controls for image capturing, and the like. In addition, the nonvolatile memory 302 stores information that also needs to be saved during periods when the power source for the image capturing apparatus 100 is turned off (for example, the user settings information, and the like), and the like.

The primary storage device 303 is configured by, for example, a RAM (Random Access Memory), or the like, and is used as a working memory for the CPU 301 and a temporary storage area for data for the image processing unit 305.

The storage medium 304 is connected to the image capturing apparatus 100 via a socket (not shown) of the main substrate 206. The storage medium 304 stores the captured image data.

The image processing unit 305 executes image processing such as subject recognition, image analysis of captured images and videos, and the like. For example, when a subject is recognized by the image processing unit 305, it provides the recognition information for the subject to the CPU 301 as feedback. Then, the CPU 301 calculates and defines the range of the subject that has been recognized by the image processing unit 305. After this, the CPU 301 displays the range of the subject that has been recognized in a live view display. The image capturing apparatus 100 is thereby able to provide the subject that has been recognized to the user in the image in a manner that is easy to understand.

The posture detection unit 307 is a posture sensor that detects the posture (the normal position or the vertical position) of the image capturing apparatus 100 during image capturing. For example, an angular speed sensor such as a piezo resistance sensor, an electrostatic capacitive sensor, or the like can be used as the posture detection unit 307.

Next, switching the second operating members group 105 between the activated state and the deactivated state in the image capturing apparatus 100 in the present embodiment will be explained with reference to FIGS. 4 through 8.

Figure 4:
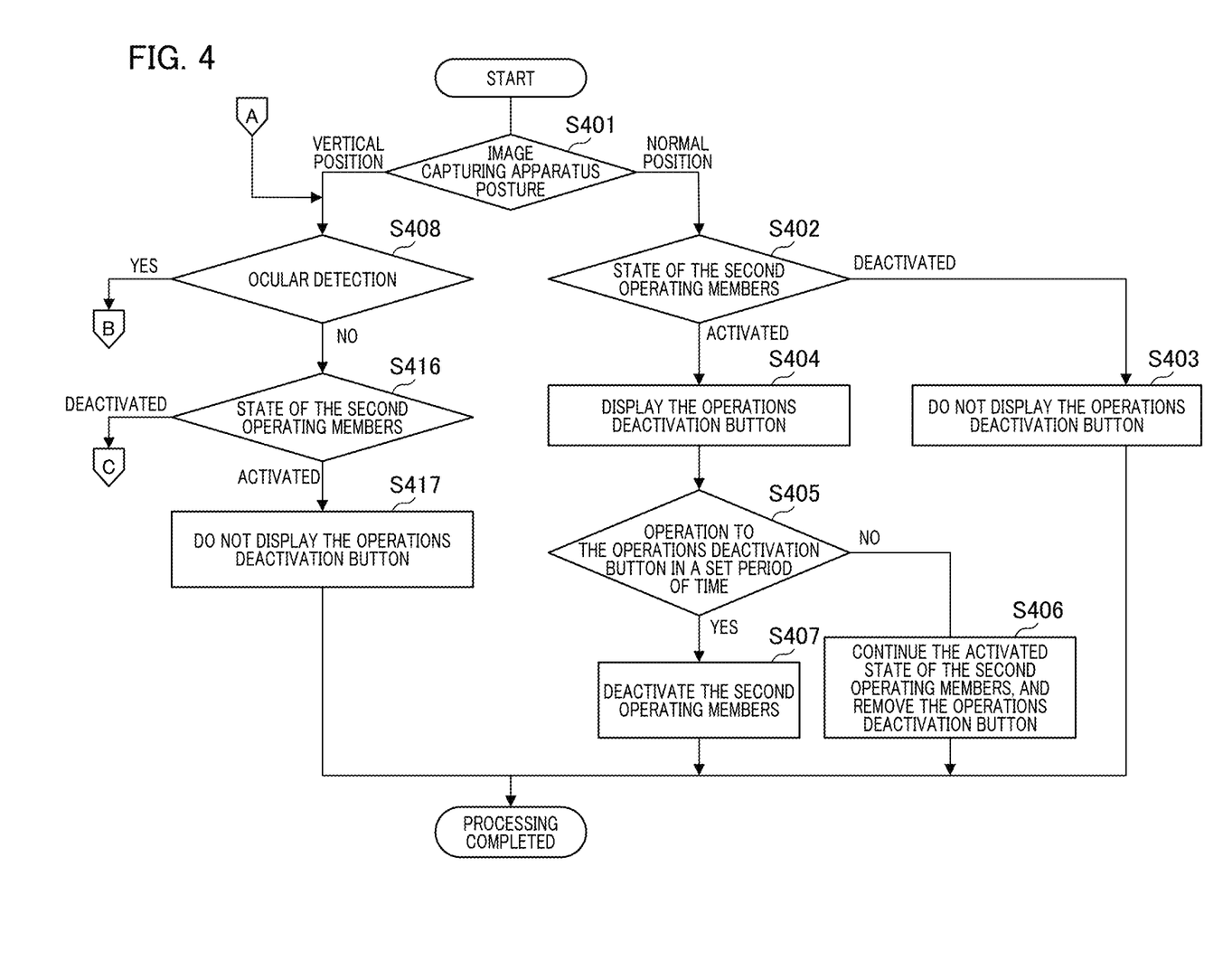
FIG. 4 is a flow chart showing an example of an operation for switching a second operating members group between an activated state and a deactivated state.
Figure 5:
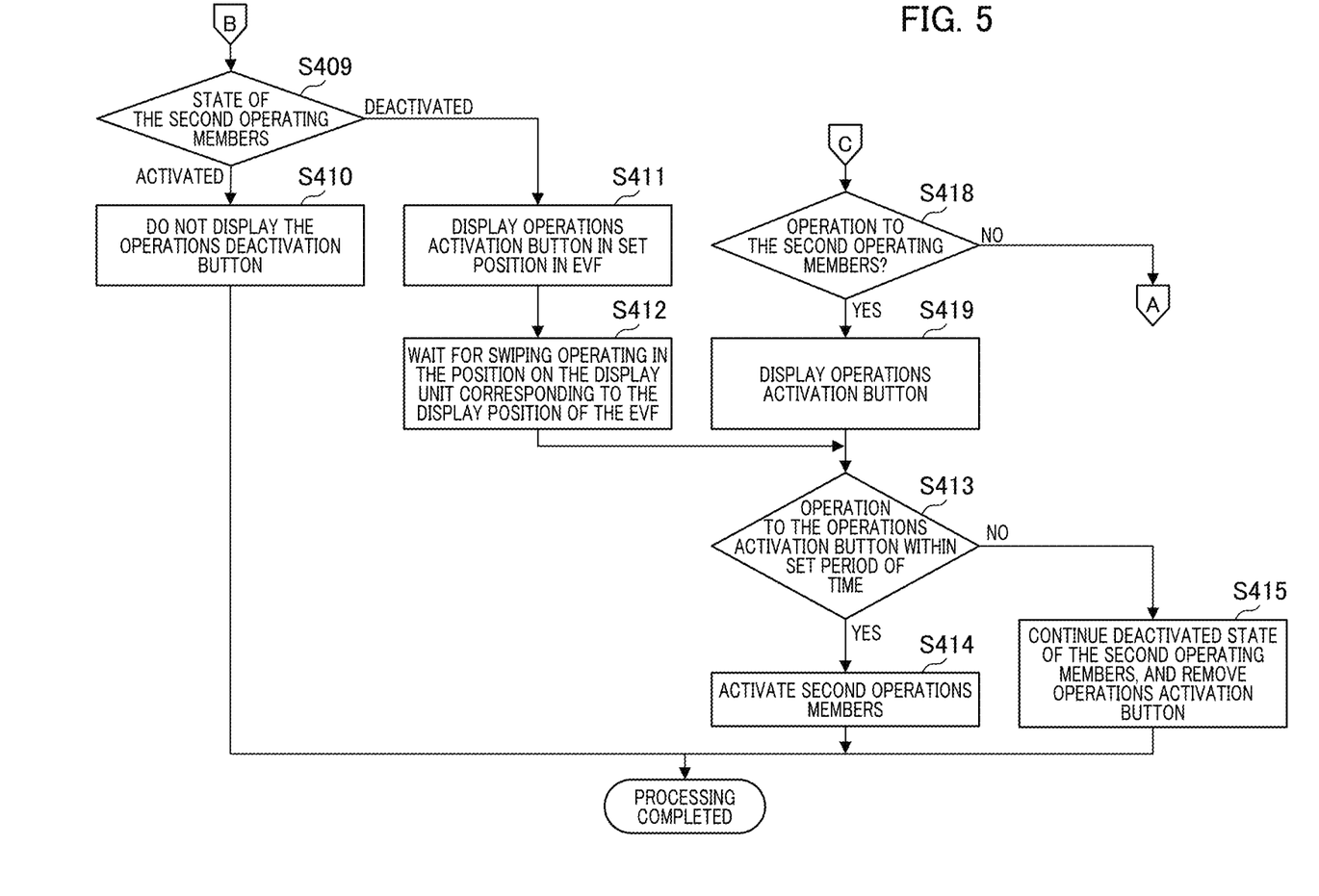
FIG. 5 is a continuation of the flow chart in FIG. 4.

FIG. 4 and FIG. 5 are flow charts that show an example of the switching operations between the activated state and deactivated state of the second operating members group 105 according to the posture of the image capturing apparatus 100 during image capturing.

The flow charts in FIG. 4 and FIG. 5 start at the stage in which the power source for the image capturing apparatus 100 has been turned on, and the user has started image capturing operations. In addition, the processing in FIG. 4 and FIG. 5 is executed by the CPU 301 loading and executing a program that has been stored on the nonvolatile memory 302.

In step S401, the CPU 301 performs startup processing for the image capturing apparatus 100 in response to the power source being turned on. Then, the CPU 301 determines if the posture of the image capturing apparatus 100 is the normal position or the vertical position based on the output from the posture detection unit 307. In the case in which the posture of the image capturing apparatus 100 is the normal position, the processing transitions to S402. In contrast, in the case in which the posture of the image capturing apparatus 100 is the vertical position, the processing transitions to S408.

In Step S402, in the case in which it has been determined that the posture is the normal position, the CPU 301 executes confirmation processing to determine the state of the second operating members group 105. In the case in which the second operating members group 105 is in the deactivated state, the processing transitions to S403. In contrast, in the case in which the second operating members group 105 is in the activated state (enabled) in which it receives operations, the processing transitions to S404.

Step S403 is the case in which the posture of the image capturing apparatus 100 is the normal position, and the second operating members group 105 is in the deactivated state. In the case of S403, erroneous operations by the second operating members group 105 will not occur in the usage of the image capturing apparatus in the normal position. Therefore, in S403, the processing is completed without the CPU 301 displaying operations deactivation buttons 501, which will be described below, on the display unit 103.

Step S404 is the case in which the posture of the image capturing apparatus 100 is the normal position, and the second operating members group 105 is in the activated state. In the case of S404, it is possible that erroneous operations by the second operating members group 105 will occur in the usage of the image capturing apparatus in the normal position. Therefore, in S404, the CPU 301 executes processing to display operations deactivation buttons 501 on the display unit 103, and prompts the user to determine whether or not to deactivate the second operating members group 105. The operations deactivation buttons 501 are one example of a first button. Note that in the case in which an eye has been detected by the ocular detection sensor of the EVF unit 202, the CPU 301 may also perform the display of the operations deactivation buttons 501 on the EVF unit 202 in the same manner as it would on the display unit 103.

Figure 6A:
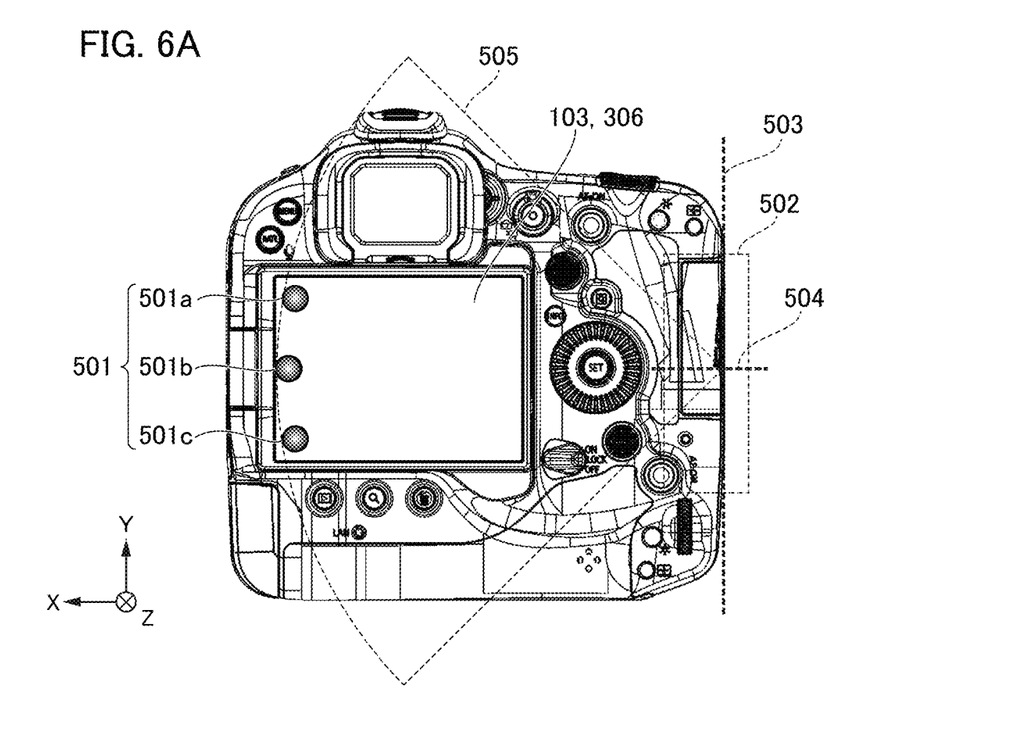
FIG. 6A is a diagram showing an example of the display positions of operations deactivation buttons in the normal position.

Next, an example of the display of the operations deactivation buttons 501 in the normal position will be explained using FIG. 6A. FIG. 6A is a diagram showing an example of the display positions of the operations deactivation buttons 501 in the normal position. In FIG. 6A, a range 502 of the normal position gripping unit of the image capturing apparatus 100, a line 503, which shows the outer edge of the normal position gripping unit, and a longitudinal approximate center line 504 of the range 502 of the normal position gripping unit are each shown using dotted lines.

The CPU 301 detects input to the operations deactivation buttons 501, which has been displayed on the display unit 103, via the touch panel unit 306 that is mounted on the display unit 103. When the operations deactivation buttons 501 are operated, the CPU 301 can deactivate operations from the second operating members group 105.

As is shown in FIG. 6A, it is preferable that the operations deactivation buttons 501 (501a to 501c) are displayed on the short side of the display unit 103 that is separated from the normal position gripping unit (the left side in FIG. 6A). When the operations deactivation buttons 501 are disposed on the short side that is separated from the normal position gripping unit, it is difficult for the user to reach the operations deactivation buttons 501 with their thumb when they are tightly gripping the normal position gripping unit 101. However, if the user loosens their grip slightly, they will be able to easily reach the operations deactivation buttons 501 with their thumb. Therefore, the above-described disposure makes it difficult for the user to unintentionally touch the operations deactivation buttons 501, and in contrast, makes it easy for the user to touch the operations deactivation buttons 501 when they intend to operate them. It is thereby possible to inhibit the unintentional deactivation of the second operating members group 105.

In addition, the operations deactivation buttons 501 (501a to 501c) may also be arranged around the circumference of a circle for which is centered on the point of intersection of the outer edge and the longitudinal center of the normal position gripping unit. In FIG. 6A, a portion of a virtual circle for which the center point is the point of intersection of the outer edge (503) of the normal position gripping unit and the longitudinal center (504) of the normal position gripping unit is shown using the numeral 505. The radius of this virtual circle 505 is a tangential line that reaches from the center point to the outer edge of the display unit (the short-left side in the diagram), and cuts across the display unit 103. The operations deactivation buttons 501a to 501c are each disposed in positions that approximately inscribe the virtual circle 505.

When the user puts their hand in the range 502 of the normal position gripping unit, the traces from operating their thumb will be approximately concentric with the above-described virtual circle 505 due to the arrangement of human joints. Therefore, if the operations deactivation buttons 501a to 501c are arranged to inscribe the virtual circle 505 based on the above-described virtual circle 505, it is difficult for the user to reach the operations deactivation buttons 501 with their thumb when they are tightly gripping the normal position gripping unit 101. In addition, it is an arrangement in which the user is able to easily reach the operations deactivation buttons 501 with their thumber if they loosen their grip slightly. It is thereby possible to inhibit unintentional erroneous operations without reducing the operability of the operations deactivation buttons 501.

Note that the display positions of the operations deactivation buttons 501 are not limited to the example in FIG. 6A, it is acceptable as long as the operations deactivation buttons 501 are in positions in which they will not be unintentionally touched in the normal position gripping state, and it may be made so that the user is able to optionally set these display positions.

Figure 6B:
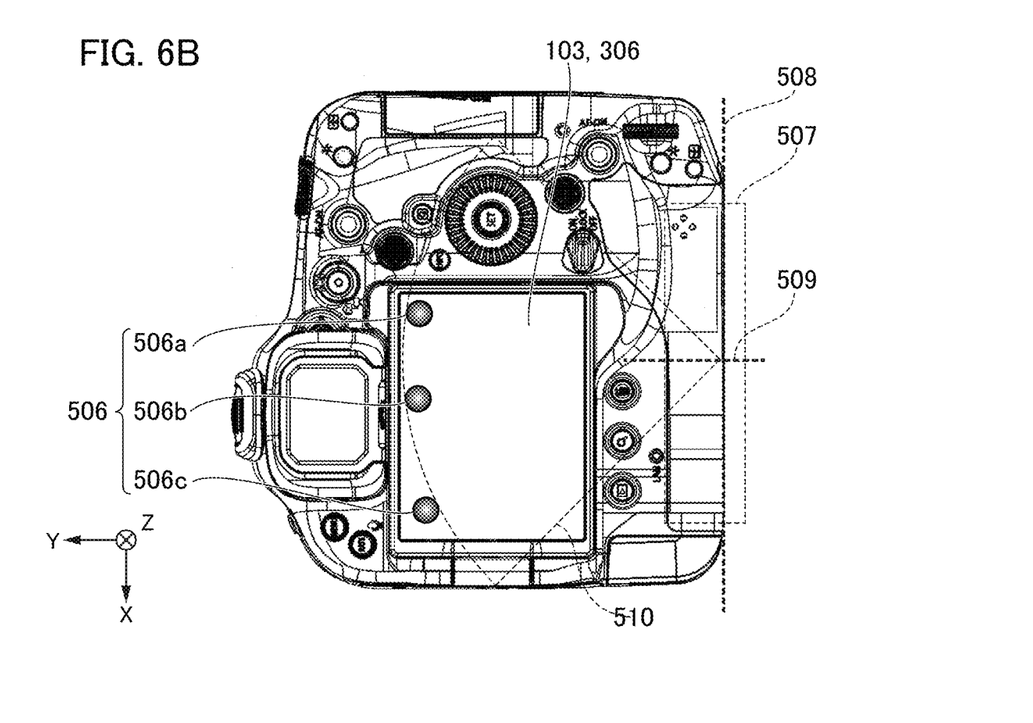
FIG. 6B is a diagram showing an example of the display positions of operations deactivation buttons in the vertical position.

Similarly, FIG. 6B is a diagram showing an example of the display positions of operations deactivation buttons 506 in the vertical position. In FIG. 6B, a range 507 of the vertical position gripping unit of the image capturing apparatus 100, a line 508 showing the outer edge of the vertical position gripping unit, and a longitudinal approximate center line 509 of the range 507 of the vertical position gripping unit are each shown as dotted lines.

The CPU 301 detects input to the operations deactivation buttons 506 that have been displayed on the display unit 103 via the touch panel unit 306 that is mounted on the display unit 103. When the operations deactivation buttons 506 are operated, the CPU 301 can deactivate operations from the second operating members group 105.

As is shown in FIG. 6B, it is preferable that the operations deactivation buttons 506 (506a to 506c) are shown on the long edge of the display unit 103 that is separated from the vertical position gripping unit (the left side in FIG. 6B). When the operations deactivation buttons 506 are disposed on the long side that is separated from the vertical position gripping unit, it is difficult for the user to reach the operations deactivation buttons 506 with their thumb when they are tightly gripping the vertical position gripping unit 102. However, if the user loosens their grip slightly, they will be able to easily reach the operations deactivation buttons 506 with their thumb. Therefore, the above-described disposure makes it difficult for the user to unintentionally touch the operations deactivation buttons 506, and in contrast, makes it easy for the user to touch the operations deactivation buttons 506 when they intend to operate them. It is therefore possible to inhibit the unintentional deactivation of the second operating members group 105.

In addition, the operations deactivation buttons 506 (506a to 506c) may also be arranged along the circumference of a circle which is centered on the point of intersection of the outer edge and the longitudinal center of the vertical position gripping unit. In FIG. 6B, a portion of a virtual circle for which the center point is the point of intersection of the outer edge (508) of the vertical position gripping unit and the longitudinal center (509) of the vertical position gripping unit is shown using the numeral 510. The radius of this virtual circle 510 is the tangential line that reaches from the center point to the outer edge of the display unit (the long-left side in the diagram), and cuts across the display unit 103. The operations deactivation buttons 506a to 506c are each disposed in positions that inscribe or circumscribe the virtual circle 510.

When the user puts their hand in the range 507 of the vertical position gripping unit, the traces from operating their thumb will be approximately concentric with the above-described virtual circle 510 due to the arrangement of human joints. Therefore, if the operations deactivation buttons 506a to 506c are arranged to inscribe or circumscribe the virtual circle 510 based on the above-described virtual circle 510, it will become difficult for the user to reach the operations deactivation buttons 506 with their thumb when they are tightly gripping the vertical position gripping unit 102. In addition, it is an arrangement in which the user is able to easily reach the operations deactivation buttons 506 with their thumb if they loosen their grip slightly. It is thereby possible to inhibit unintentional erroneous operations without reducing the operability of the operations deactivation buttons 506.

Note that the display positions of the operations deactivation buttons 506 are not limited to the example in FIG. 6B, it is acceptable as long as they are in positions in which they will not be unintentionally touched in the vertical position gripping state, and it may be made so that the user is able to optionally set the display positions.

Figure 8:
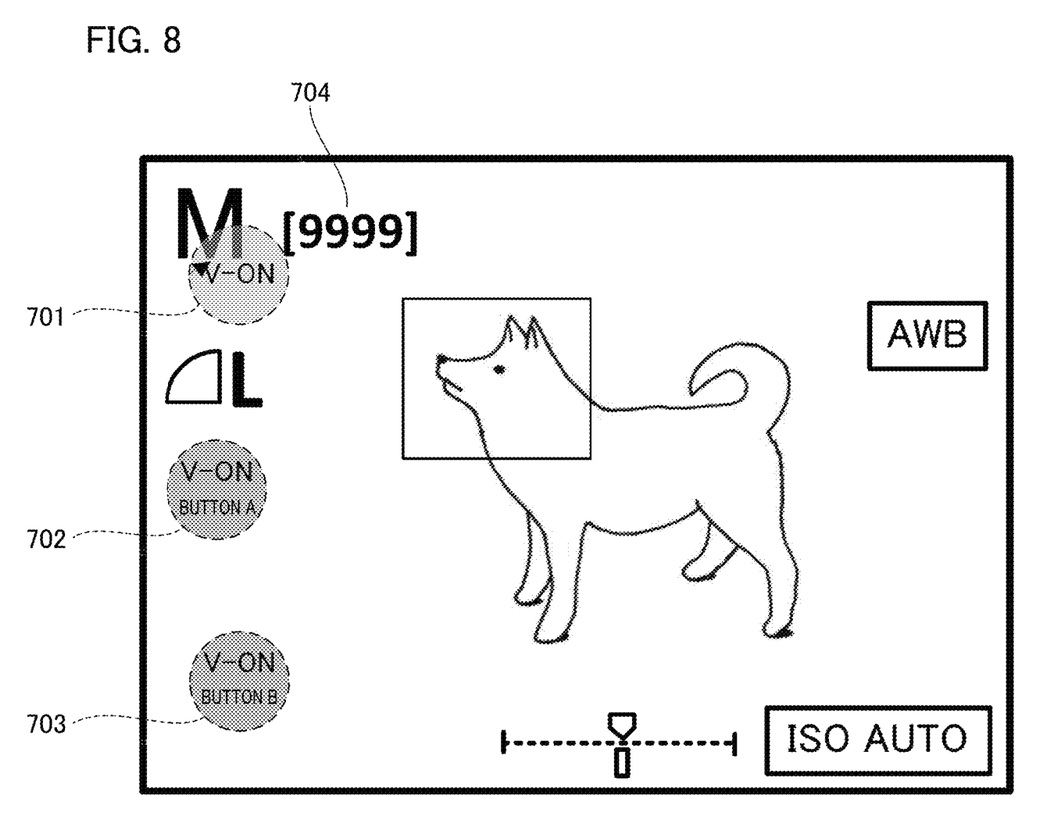
FIG. 8 is a diagram showing an example of a screen display of the display unit.

Next, the specific display method for the operations deactivation buttons 501 in the normal position will be explained with reference to FIG. 8. FIG. 8 is a diagram showing an example of a screen display of the display unit 103.

The screen that is shown in FIG. 8 corresponds to a live-view display during image capturing, and each of a button 701, 702, and 703, which are operations deactivation buttons 501, are displayed on the screen. In addition, on the screen in FIG. 8, a display 704, which shows the settings state of the image capturing conditions of the image capturing apparatus 100, is displayed.

As one example, the button 701 is a button that deactivates the entirety of the second operating members group 105. The buttons 702 and 703 are both buttons that individually deactivate specific operating members that are included in the second operating members group 105. All of the buttons 701 to 703 may be displayed on the screen, and arbitrary buttons from among the buttons 701 to 703 may be selectively displayed on the screen based on user settings.

In the case in which the image capturing apparatus 100 is being used in the normal position, the buttons 701, 702, and 703 are displayed in the vicinity of the short-left side of the display unit 103. However, there are cases in which the display positions of the buttons 701, 702, and 703 and the display 704, which shows the settings state of the image capturing conditions, overlap on the screen. In the example in FIG. 8, the position of the button 701 overlaps with the display 704.

In the case in which the positions of the button 701 and the display 704 overlap, as has been described above, the CPU 301 performs control so that the button 701 is made translucent and is displayed as being superimposed on the display 704. Conversely, in the case in which the buttons 701 to 703 are not displayed at the same time, the CPU 301 may, for example, perform control such that the operations deactivation buttons are displayed while avoiding positions that overlap with the display 704, such as the positions of buttons 702 and 703. By performing the above-described control, the operations deactivation buttons can be displayed on the screen without hindering the visibility of the display 704.

Returning to FIG. 4, in step S405, the CPU 301 determines whether or not the operations deactivation buttons 501 have been operated within a set amount of time after the operations deactivation buttons 501 have been displayed on the display unit 103. In the case in which the operations deactivating buttons 501 have been operated within the set amount of time, the processing transitions to S407. In contrast, in the case in which the operations deactivation buttons 501 have not been operated within the set amount of time, the processing transitions to S406.

In step S406, the CPU 301 continues the activated state of the second operating members group 105, and in addition, in order to improve the visibility of the display unit 103, the CPU 301 removes the display of the operations deactivation buttons 501 from the display unit 103, and the processing is completed.

Note that the re-display of the operations deactivation buttons 501 is performed according to user settings contents and user operations. For example, an item related to the re-display of the operations deactivation buttons 501 may be provided in the settings menu of the image capturing apparatus 100.

In step S407, the CPU 301 switches the second operating members group 105 to the deactivated state according to the operation of the operations deactivation buttons 501, and the processing is completed.

In this context, in the case in which the second operating members group 105, which has been deactivated, is to be re-activated, the user will switch the posture of the image capturing apparatus to the vertical position. Then, the second operating members group 105 can be activated by the processing for the case in which the vertical position has been determined in S401 (the processing of S408 and after). It is thereby possible for the user to switch between the activated state and the deactivated state of the second operating members group 105 at the desired timing.

Step S408 is the processing for the case in which the posture of the image capturing apparatus 100 is in the vertical position. In S408, the CPU 301 determines if the user is looking into the EVF unit 202 by using the ocular detection sensor of the EVF unit 202. In the case in which the user is looking into the EVF unit 202, the processing transitions to S409. In contrast, in the case in which the user is not looking into the EVF unit 202, the processing transitions to S416.

In step S409, the CPU 301 executes confirmation processing to determine the state of the second operating members group 105. In the case in which the second operating members group 105 is in the activated state in which it receives operations, the processing transitions to S410. In contrast, in the case in which the second operating members group 105 is in the deactivated state, the processing transitions to S411.

Step S410 is the case in which the posture of the image capturing apparatus 100 is the vertical position and the second operating members group 105 is in the activated state. In the above-described case, it can be determined that the user is performing image capturing in the vertical position. In addition, in, for example, the case in which operations to the first operating members group 104 are detected during image capturing in the vertical position, it can be assumed that the user is holding the normal position gripping unit 101, and is performing image capturing in the vertical position, by rotating the image capturing apparatus 100 by 90°. In such a case, since the user is holding the normal position gripping unit 101, and second operating members group 105 can be activated or deactivated either of them is unlikely to interfere with image capture. Therefore, the CPU 301 may perform control so as not to perform the display of the operations deactivation buttons 506 when capturing images in the vertical position.

Note that even in the case in which the user is not looking into the EVF unit 202 during image capturing in the vertical position, due to the same reason that has been described above, the CPU 301 may perform control so as not to perform the display of the operations deactivation buttons 506.

Therefore, in S410, the processing is completed without the CPU 301 displaying the operations deactivation buttons 506 on the display unit 103 (not displaying).

Step S411 is the case in which the posture of the image capturing apparatus 100 is the vertical position, and the second operating members group 105 is in the deactivated state. In the case of S411, the second operating members group 105 is deactivated even if the user tries to capture images in the vertical position. Therefore, in S411, the CPU 301 executes processing to display operations activation buttons 602 on the display unit 103, and prompts the user to determine whether or not to activate the second operating members group 105. The operations activation buttons 602 are one example of a second button.

Figure 7:
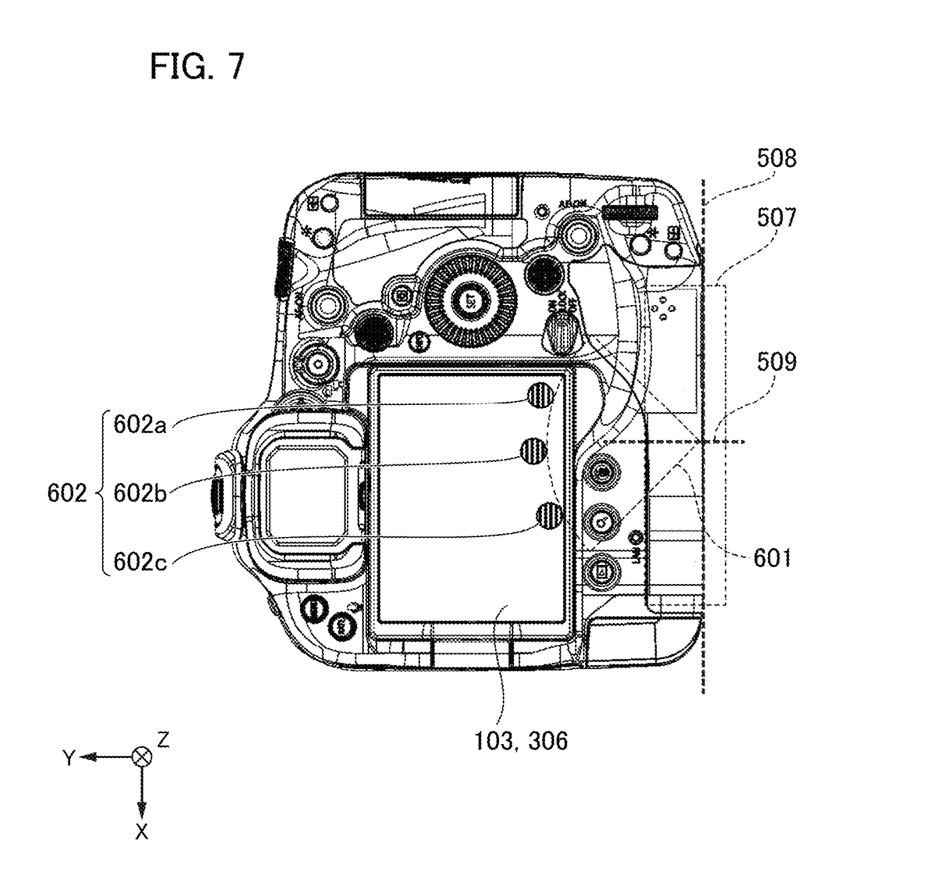
FIG. 7 is a diagram showing an example of the display positions of operations activation buttons in the vertical position.

Next, an example of a display of the operations activation buttons 602 in the vertical position will be explained using FIG. 7. FIG. 7 is a diagram showing an example of the display positions of the operations activation buttons 602 in the vertical position. In FIG. 7, in the same manner as in FIG. 6B, a range 507 of the vertical position gripping unit of the image capturing apparatus 100, a line 508 showing the outer edge of the vertical position gripping unit, and a longitudinal approximate center line 509 of the range 507 of the vertical position gripping unit are all shown using dotted lines.

The CPU 301 detects input to the operations activation buttons 602, which have been displayed on the display unit 103, via the touch panel unit 306 that is mounted on the display unit 103. When the operations activation buttons 602 are operated, the CPU 301 switches the second operating members group 105 from the deactivated state to the activated state.

As is shown in FIG. 7, it is preferable that the operations activation buttons 602 (602a to 602c) are displayed on the long side of the display unit 103 that faces the vertical position gripping unit (the long-right side in the diagram). Due to the above-described disposition, it is possible for a user to touch and operate the operations activation buttons 602 with their thumb without straining, even if they are looking into the EVF unit 202.

In addition, the operations activation buttons 602 (602a to 602c) may also be arranged along the circumference of a circle which is centered on the point of intersection of the outer edge and the longitudinal center point of the vertical position gripping unit. In FIG. 7, a portion of a virtual circle which is centered on the point of intersection of the outer edge (508) of the vertical position gripping unit and the longitudinal center (509) of the vertical position gripping unit as its center is shown using the numeral 601. The radius of this virtual circle 601 is the length of the line that connects the point of intersection of the lines 508, and 509 and the upper righthand corner of the display unit 103. That is, the radius of the virtual circle 601 is shorter than the radiuses of the virtual circles 505, and 510. The operations activation buttons 602a to 602c are each disposed in positions that circumscribe the virtual circle 601.

When the user puts their hand in the range 507 of the vertical position gripping unit, the traces from operating their thumb will be approximately concentric with the above-described virtual circle 601 due to the arrangement of human joints. Therefore, if the operations activation buttons 602a to 602c are arranged along the above-described virtual circle 601, it is easy for the user to touch and operate each of the operations activation buttons 602 with their thumb. In addition, the operations activation buttons 602 are disposed in positions that are closer to the user's fingers than the operations deactivation buttons 501, and therefore, it is possible to operate the operation activation buttons 602 more easily than the operations deactivation buttons 501.

In addition, the CPU 301 may display the screen that is displayed on the display unit 103 on the EVF unit 202. It thereby becomes possible to easily perform touch operations to the operations activation buttons 602 even if the user is looking into the EVF unit 202.

Note that the display positions of the operations activation buttons 602 are not limited to the example in FIG. 7, and it may be made so that the user can optionally set the display positions of the operations activation buttons 602.

In step S412, the CPU 301 waits for an operation to the operations activation buttons 602 shown in FIG. 7. The operation of the operations activation buttons 602 to activate the second operating members group 105 may be performed by just touching the operations activation buttons 602, however, it may also be made a swiping operation in which the touch is accompanied by a sliding motion afterwards. By making the operation a swiping operation, it is possible to reliably take the user's intentions into consideration, and in addition, it is also possible to inhibit erroneous operations due to the user's face, nose, or the like touching the button when they are looking into the EVF unit 202.

In step S413, the CPU 301 determines if the operations activation buttons 602 have been operated (for example, by a swiping operation) within a set period of time after the operations activation buttons 602 have been displayed on the display unit 103. In the case in which the operations activation buttons 602 have been operated within the set period of time, the processing transitions to S414. In contrast, in the case in which the operations activation buttons 602 have not been operated within the set amount of time, the processing transitions to S415.

In step S414, the CPU 301 switches the second operating members group 105 to the activated state according to the operation of the operations activation buttons 602, and the processing is completed.

When the second operating members group 105 is in the deactivated state, there are cases in which, for example, image reproduction mode or the like is started while the image capturing apparatus 100 is being held in the vertical position, and the user is confirming or editing images that have been captured in the vertical position. When this happens, in the case in which the user would like to use the second operating members group 105, they can activate operations from the second operating members group 105 by a swiping operation on the operations activation buttons 602 that have been displayed on the display unit 103. That is, the user is able to comfortably perform the desired image confirmation or the like without changing their grip on the image capturing apparatus 100 to the normal position and performing the cumbersome operation of activating the second operating members group 105 from the menu.

In step S415, the CPU 301 continues the deactivated state of the second operating members group 105. In addition, in order to improve the visibility of the display unit 103, the CPU 301 removes the display of the operations activation buttons 602 from the display unit 103, and the processing is completed.

Note that the re-display of the operations activation buttons 602 is performed according to user settings contents and user operations. For example, an item related to the re-display of the operations activation buttons 602 may be provided in the settings menu of the image capturing apparatus 100.

Step S416 is the case in which the posture of the image capturing apparatus 100 is the vertical position, and the user is not looking into the EVF unit 202. In S416, the CPU 301 executes confirmation processing to determine the state of the second operating members group 105. In the case in which the second operating members group 105 is in the deactivated state, the processing transitions to S418. In contrast, in the case in which the second operating members group 105 is in the activated state, the processing transitions to S417.

Step S417 is the case in which the posture of the image capturing apparatus is the vertical position, and the second operating members group 105 is in the activated state. In the above-described case, it can be determined that the user is performing image capturing in the vertical position, and also that there will be no hindrance to the operations of the image capturing apparatus 100. Therefore, in S417, the processing is completed without the CPU 301 displaying the operations activation buttons 602 on the display unit 103 (not displaying).

Step S418 is the case in which the posture of the image capturing apparatus 100 is the vertical position, and the second operating members group 105 is in the deactivated state. In S418, the CPU 301 determines if the user has operated the deactivated second operating members group 105. In the case in which the second operating members group 105 has not been operated, the processing returns to S408. In contrast, in the case in which the second operating members group 105 has been operated, the processing transitions to S419.

In step S419, the CPU 301 performs a warning display that shows that operations from the second operating members group 105 are deactivated on the display unit 103, and prompts the user to activate the second operating members group 105. After this, the CPU 301 displays the operations activation buttons 602 on the display unit 103, transfers the processing to S413, and waits for input from the operations activation buttons 602.

The above concludes the explanation of the flow charts in FIG. 4, and FIG. 5.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-105512, filed Jun. 25, 2021 which is hereby incorporated by reference herein in its entirety.

What is claimed is:

1. An image capturing apparatus having a display unit and a touch panel that has been mounted on the display unit on the rear side of a housing, the image capturing apparatus comprising:
    a posture detection unit configured to detect a normal position and a vertical position of the image capturing apparatus;
    a first gripping unit configured to be positioned on side of the housing when the posture of the image capturing apparatus is the normal position;
    a second gripping unit configured to be positioned on side of the housing when the posture of the image capturing apparatus is the vertical position;
    a first operating member operable by a finger of a hand that is gripping the first gripping unit;
    a second operating member operable by a finger of a hand that is gripping the second gripping unit; and
    a control unit configured to display a first button configured to deactivate operations from the second operating member on the display unit, and to receive input to the first button via the touch panel, wherein
    the display position of the first button on the display screen is set based on a first virtual circle for which the center point has been set in a range of the first gripping unit or the second gripping unit, and wherein
    the radius of the first virtual circle is a tangential line that reaches from the center point to the outer edge of the display unit and cuts across the display unit.

2. The image capturing apparatus according to claim 1, wherein
    the center point is positioned on the longitudinal center of the first gripping unit or the longitudinal center of the second gripping unit.

3. The image capturing apparatus according to claim 1, wherein
    the control unit switches between displaying and not displaying the first button according to the posture of the image capturing apparatus when operations from the second operating member are activated.

4. The image capturing apparatus according to claim 3, wherein
the control unit displays the first button when the posture of the image capturing apparatus is the normal position, and does not display the first button when the posture of the image capturing apparatus is the vertical position.

5. The image capturing apparatus according to claim 1, wherein
the second operating member includes a plurality of operating members, and
the control unit displays a plurality of first buttons on the display unit, and receives input to individually deactivate the plurality of operating members that are included in the second operating member from the plurality of first buttons.

6. The image capturing apparatus according to claim 1, wherein
the control unit displays a second button configured to activate operations from the second operating member on the display unit, and receives input to the second button via the touch panel when operations from the second operating member are deactivated, wherein
a display position of the second button on the display unit is set based on a second virtual circle from the center point, wherein
the radius of the second virtual circle is shorter than the radius of the first virtual circle.

7. The image capturing apparatus according to claim 6, wherein
the input to the second button is a swiping operation of the touch panel.

8. The image capturing apparatus according to claim 6, wherein
the second operating member includes a plurality of operating members, and
the control unit displays a plurality of second buttons on the display unit, and receives input to individually activate the plurality of operating members that are included in the second operating member from the plurality of second buttons.

9. The image capturing apparatus according to claim 6, wherein,
the control unit displays the second button on the display unit if an operation of the second operating member is detected when operations from the second operating member are deactivated.

10. The image capturing apparatus according to claim 1, wherein
the control unit outputs a warning on the display unit if an operation of the second operating member is detected when operations from the second operating member are deactivated.

* * * * *